Dec. 3, 1940.    R. B. SHORE    2,224,066
INNER BUFFER FOR TIRES
Filed March 6, 1939
Fig. 1.
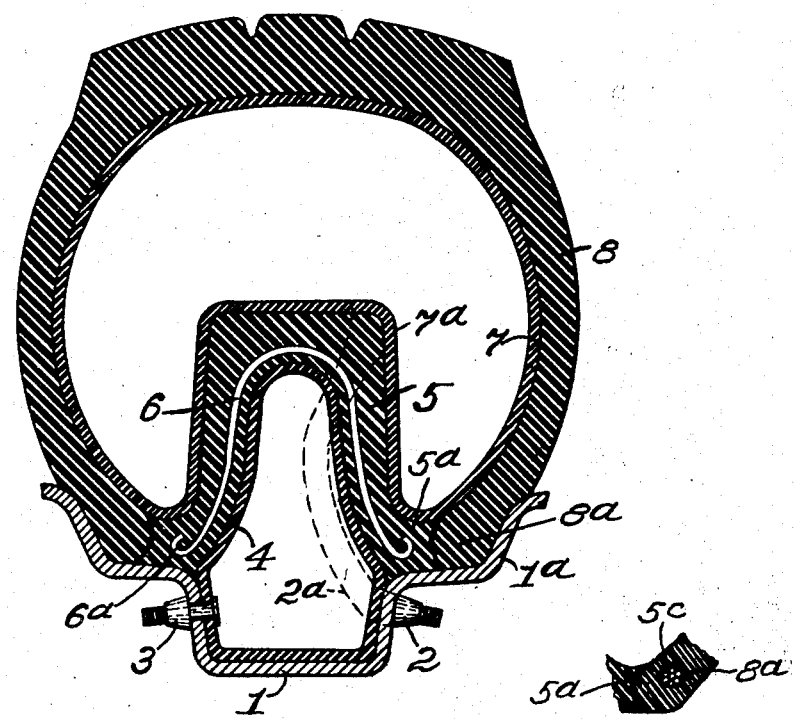
Fig. 3.
Fig. 4.
Fig. 2.
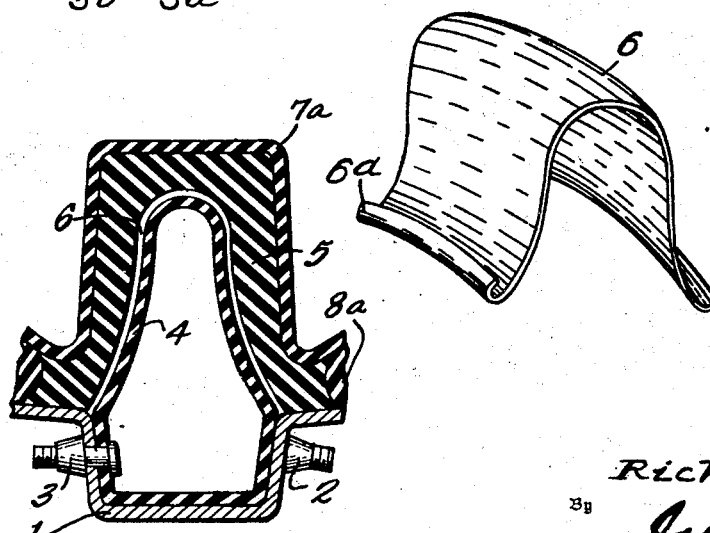
Fig. 5.
Inventor
Richard B. Shore,
By
G. C. Kennedy.
Attorney Patented Dec. 3, 1940

2,224,066

UNITED STATES PATENT OFFICE 2,224,066

INNER BUFFER FOR TIRES

Richard B. Shore, Oelwein, Iowa, assignor of forty-nine one-hundredths to Edward Nelson, Oelwein, Iowa Application March 6, 1939, Serial No. 259,953

3 Claims. (Cl. 152—158)

My invention relates to improvements in inner buffers for tires, and the object of my improvement is to furnish for automobile tires or the like interior separable cushioning buffers shaped, associated and adapted for supporting and maintaining such tires against partial or complete collapse from any cause.

Another object of my improvement is to incorporate within the buffer device of a hollow tire mounted on a troughed rim, interior reinforcing resilient sectional members for strengthening the same.

Another object of my improvement is to provide an additional inner tube, which can further support the casing in case of leakage or other kinds of collapse of the inner tube including displacements of said inner buffer means.

These objects I have attained in my invention, by successful trials, and effective operation, by the means stated, and which are illustrated, described and claimed herein.

Figure 1 is a cross section of my improved buffer supported hollow tire, and also showing one of the resilient sectional members in end elevation. Fig. 2 is a perspective view of one of said reinforcing sectional members. Fig. 3 is a detail of mating parts of the buffer and bead, and Fig. 4 is a section of the reinforced casing ring and bead.

Fig. 5 is a fragmental cross-section of the parts 1, 7a, 5, 8a and 4, showing in cross-section a member 6 without outturned rims, seated removably between the inner wall of the member 5 and the second inner tube 4.

Referring to said Fig. 1, an elastic and hollow rubber tire 8 has its beaded edges 8a shaped to seat within and conform to the outer hollowed seats 1a of a troughed wheel rim 1. An elastic inner tube 7 is mounted within the tire 8, and if desired may be made of extra diameter in order to be seated within the hollow of the tire 8 to fit it while having an intruded portion 7a of its wall provided for fitting upon a received elastic annulus or ring-shaped buffer 5 which has a body extending inwardly to about the middle line of the tire 8 and main wall of the inner tube 7. The member 5 has a radially inwardly opening medial trough therearound, and as shown in the figures, U-shaped resilient metal members 6 with outwardly hooked edges 6a are embedded in the side parts of the buffer 5 around its inner trough, said members 6 being sectionally arranged within and around the buffer for supporting it, yieldingly. The outer rim parts 5a of the buffer 5 are directed outwardly and may be slightly circumferentially troughed to fit upon the beads 8a of the tire 8, interlocking therewith in maintaining the beads engaged under some compression with the tire rim, as shown at 1a.

The wheel rim 1 shown is of the deep-channel straight-side type, but may be varied in shape of its cross section as desired in order to properly shape it to conform to the tire beads as desired, while maintaining the inner resilient structures against too much deformation under stress and locking the buffer devices properly in place.

A second inner inflatable rubber tube 4, of less size than the inner tube 7, is fitted into the outer trough of the buffer ring 5 and is seated in and to fit the medial trough of the rim member 1 when inflated. In Fig. 1, the usual valve device 2 is mounted upon a side wall of the rim 1 and the dotted lines denote an auxiliary tube leading through the tubes and buffer into the main inner tube 7. A similar valve 3 and tube leads from another part of the rim into the smaller interior tube 4.

It will be understood, that in case of deflation of the inner tube 7, the outer tire 8 will collapse enough to subside upon and engage the outer part of the ring 5, covered by the part 7a, and will be supported sufficiently to permit the tire to be used for a time when in use. The inner tube 4 is protected from puncture from without by said metal members 6.

The metal segments 6, with any desired other shape and size, may be mounted between the buffer 5 and tube 4 as shown in Fig. 5.

Fig. 3 shows detents 5b on the part 5a of the buffer 5 to fit into corresponding cavities in the part 8a as other anchoring means.

Fig. 4 shows a resilient cable of wire components at 5c which may be embedded in the parts 8a therearound to strengthen these parts when desired. When the casing 8 is removed, the buffer 5 may be compressed and removed.

I claim:

1. In combination, a circumferentially troughed wheel rim, a split elastic tire casing removably seated thereon, a primary elastic circular inner tube within the casing, an annular buffer body having an outer medial annular rib covered upon its outer face and sides by an outturned part of said inner tube, the buffer body having an inner annular medial recess around it, and having outwardly directed lateral edge parts engaged with the casing beads, inwardly concaved and arcuate resilient metal segments embedded within and alined around the buffer body, and another and inner circular secondary elastic inflatable inner tube mounted in the interspace of the annular hollow wall of the buffer body and the wheel rim, whereby when the secondary tube is inflated and said primary tube is wholly or partially deflated, the secondary tube maintains the buffer body uncollapsed and lockably retains said tire casing upon the wheel rim.

2. In combination, a circumferentially troughed wheel rim, a split elastic tire casing removably seated thereon, a primary elastic circular inner tube within the casing, an annular buffer body having an outer medial annular rib covered upon its outer face and sides by an outturned part of said inner tube, the buffer body having an inner annular medial recess around it, and having outwardly directed lateral edge parts engaged with the casing beads, inwardly concaved and arcuate resilient metal segments embedded within and lengthwise alined around the buffer body, the longitudinal edge parts of the segments being upset outwardly to anchor them in the buffer body, and another and inner circular secondary elastic inflatable inner tube mounted between the buffer body and the wheel rim, whereby when the secondary tube is inflated and said primary tube is wholly or partially deflated, the secondary tube maintains the buffer body uncollapsed and lockably retains said tire casing upon the wheel rim.

3. In combination, a circumferentially troughed wheel rim, a split elastic tire casing removably seated thereon, a primary elastic circular inner tube within the casing, an elastic annular buffer body having an inner annular medial recess around it, and having outwardly directed lateral parts engaged with the casing beads, another and inner circular secondary elastic inflatable inner tube mounted in the interspace between the wall of the annular hollow of the buffer body and the outer annular trough of said wheel rim, whereby when the secondary tube is inflated and said primary tube is wholly or partially deflated, the secondary tube maintains the buffer body uncollapsed and lockably retains said tire casing upon the wheel rim, the outwardly directed lateral parts of the buffer having end detents and the abutting faces of the casing beads having hollows to engage and seat said detents.

RICHARD B. SHORE.